(12) United States Patent
Miller et al.

(10) Patent No.: US 11,388,886 B2
(45) Date of Patent: Jul. 19, 2022

(54) BATHING APPARATUS FOR COMPANION ANIMALS

(71) Applicant: iDeaWare Squared, Inc., Merritt Island, FL (US)

(72) Inventors: David H. Miller, Merritt Island, FL (US); Paul C. Hoffmann, Crossville, TN (US)

(73) Assignee: iDeaWare Squared, Inc., Merritt Island, FL (US)

( * ) Notice: Subject to any disclaimer, the term of this patent is extended or adjusted under 35 U.S.C. 154(b) by 577 days.

(21) Appl. No.: 16/215,937

(22) Filed: Dec. 11, 2018

(65) Prior Publication Data

US 2019/0174715 A1    Jun. 13, 2019

Related U.S. Application Data

(60) Provisional application No. 62/597,396, filed on Dec. 11, 2017.

(51) Int. Cl.
*A01K 15/00*    (2006.01)
*A01K 13/00*    (2006.01)
*A61D 11/00*    (2006.01)

(52) U.S. Cl.
CPC ............ *A01K 13/001* (2013.01); *A61D 11/00* (2013.01)

(58) Field of Classification Search
CPC ...... A01K 13/00; A01K 13/001; A01K 15/00; A01K 15/026; A61D 11/00
USPC .................................................. 119/600, 671
See application file for complete search history.

(56) References Cited

U.S. PATENT DOCUMENTS

| | | | | |
|---|---|---|---|---|
| 4,660,506 A | * | 4/1987 | Nalven | A01K 1/011 119/163 |
| 5,794,570 A | * | 8/1998 | Foster | A01K 13/001 119/673 |
| 6,988,467 B1 | * | 1/2006 | Smith | A01K 13/001 119/673 |
| 7,040,254 B1 | * | 5/2006 | Rucker | A01K 13/001 119/675 |
| 7,497,188 B2 | * | 3/2009 | Cho | A01K 13/001 119/604 |
| 7,913,652 B1 | * | 3/2011 | Lutz | A01K 13/001 119/674 |
| 7,921,812 B1 | * | 4/2011 | Carrillo | A01K 13/001 119/604 |
| 8,061,304 B1 | * | 11/2011 | Ramsay | A01K 13/001 119/671 |
| 8,069,821 B1 | * | 12/2011 | Green | A01K 13/001 119/671 |
| 8,215,266 B2 | | 7/2012 | Tarbutton | |
| 2003/0000482 A1 | * | 1/2003 | Batterton | A01K 13/001 119/650 |

(Continued)

*Primary Examiner* — Richard T Price, Jr.
(74) *Attorney, Agent, or Firm* — Tyler A. Stevenson

(57) ABSTRACT

A bathing apparatus for a pet, comprising a top section comprising walls to hold a pet; a bottom section adapted to support and seat the apparatus on a surface; and a bathing section situated between the top and bottom sections comprising a bathing floor configured for the pet to sit or stand on; wherein the bathing section is adapted to allow bathing water to flow away from the pet. The bathing section may comprise a bathing floor and an outer section adapted to allow water to flow through. The apparatus may be used as a bath or a shower.

20 Claims, 17 Drawing Sheets

(56) References Cited

U.S. PATENT DOCUMENTS

| | | | | |
|---|---|---|---|---|
| 2003/0196608 | A1* | 10/2003 | Lee | A01K 13/001 |
| | | | | 119/651 |
| 2007/0039559 | A1* | 2/2007 | Foster | A01K 13/001 |
| | | | | 119/676 |
| 2007/0079766 | A1* | 4/2007 | Park | A61D 11/00 |
| | | | | 119/674 |
| 2007/0095301 | A1* | 5/2007 | Boylan | A01K 13/001 |
| | | | | 119/676 |
| 2007/0163515 | A1* | 7/2007 | Yoerg | A01K 13/001 |
| | | | | 119/673 |
| 2009/0223464 | A1* | 9/2009 | Dumenil | A01K 13/001 |
| | | | | 119/676 |
| 2011/0017147 | A1* | 1/2011 | Petruzzi | A01K 13/001 |
| | | | | 119/604 |
| 2011/0067645 | A1* | 3/2011 | Arndt | A01K 13/001 |
| | | | | 119/665 |
| 2011/0297103 | A1* | 12/2011 | Iou | A01K 13/001 |
| | | | | 119/676 |
| 2012/0037085 | A1* | 2/2012 | Caisse | A01K 13/001 |
| | | | | 119/676 |
| 2012/0048209 | A1* | 3/2012 | Tarbutton | A01K 13/001 |
| | | | | 119/673 |
| 2012/0180733 | A1* | 7/2012 | Euse | A01K 31/04 |
| | | | | 119/479 |
| 2013/0055962 | A1* | 3/2013 | Scoggins | A01K 13/001 |
| | | | | 119/453 |

* cited by examiner

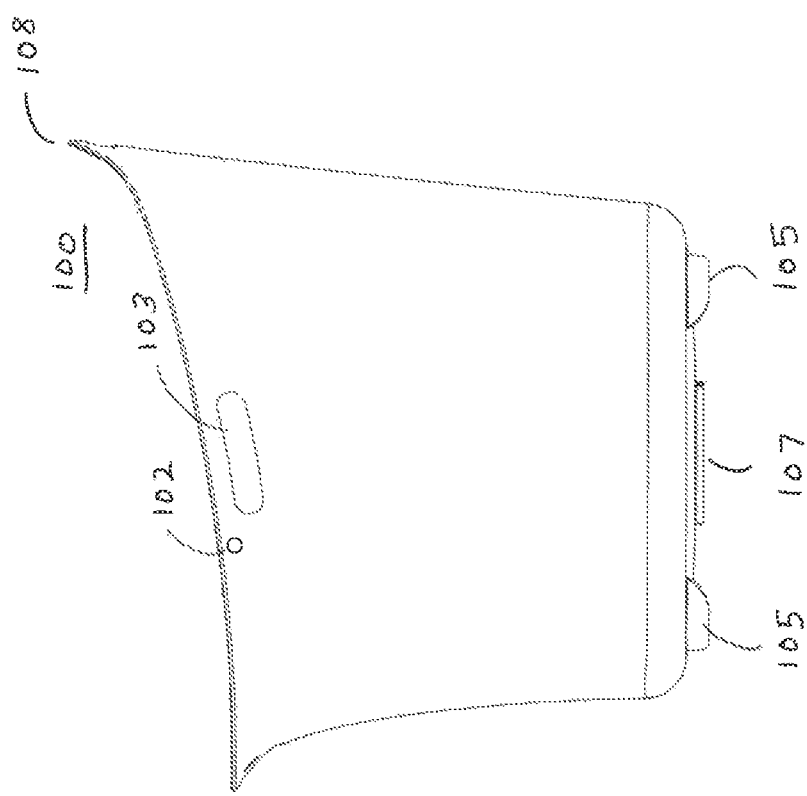
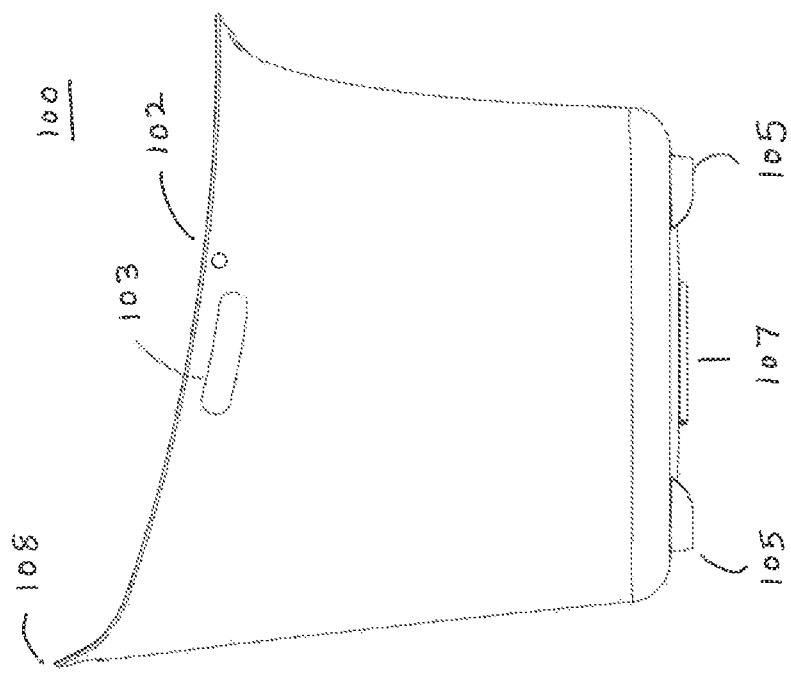

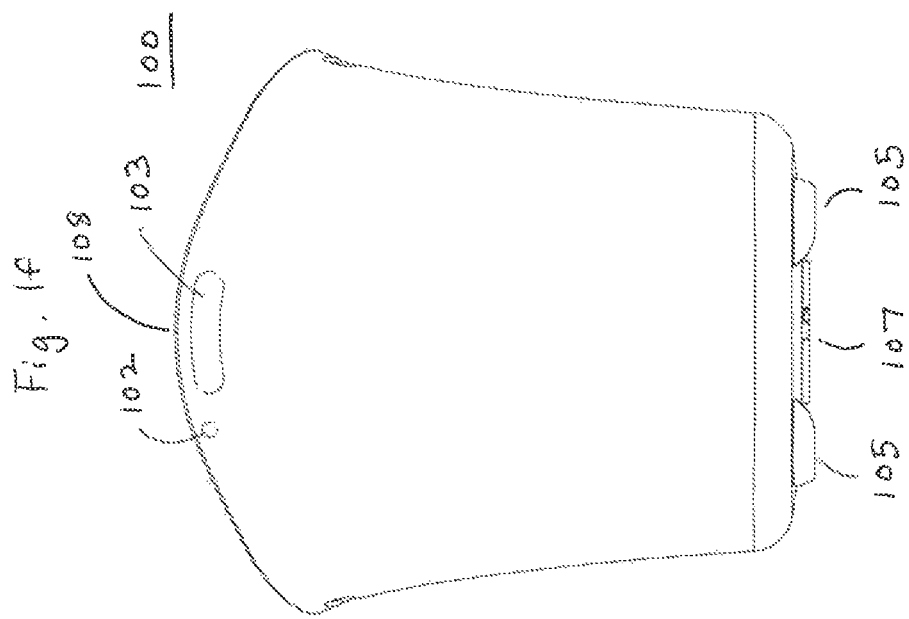
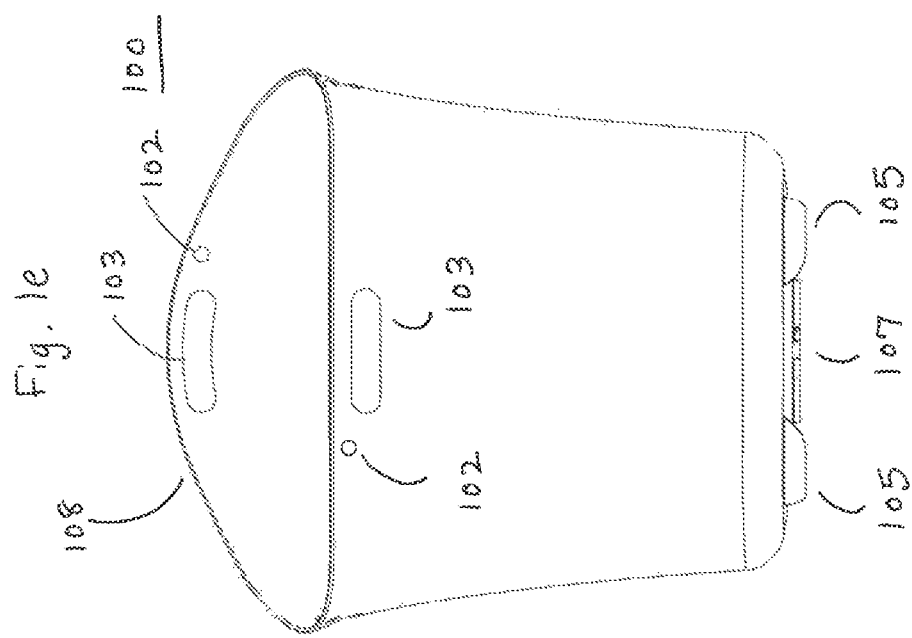

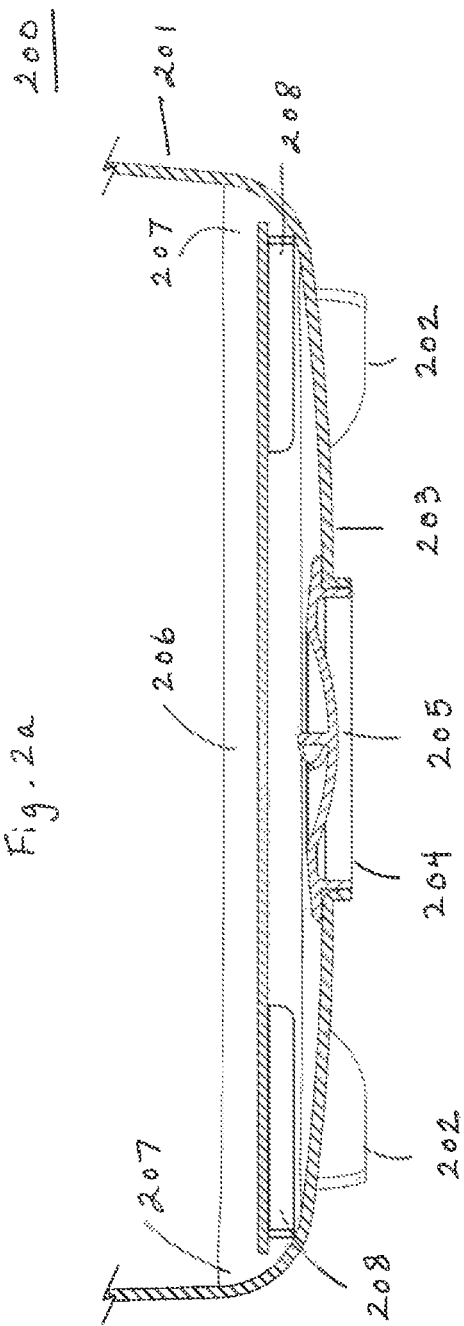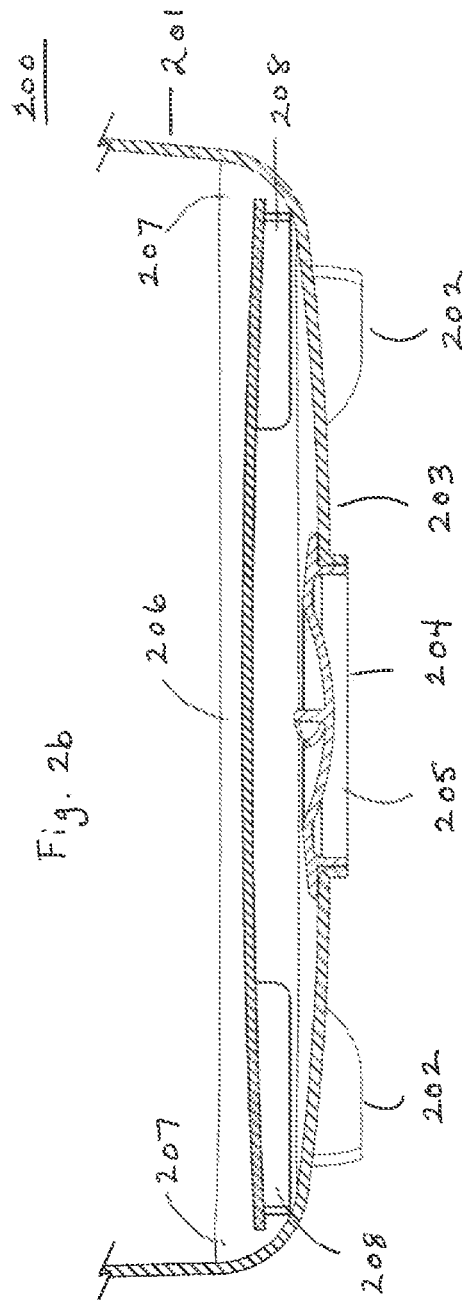

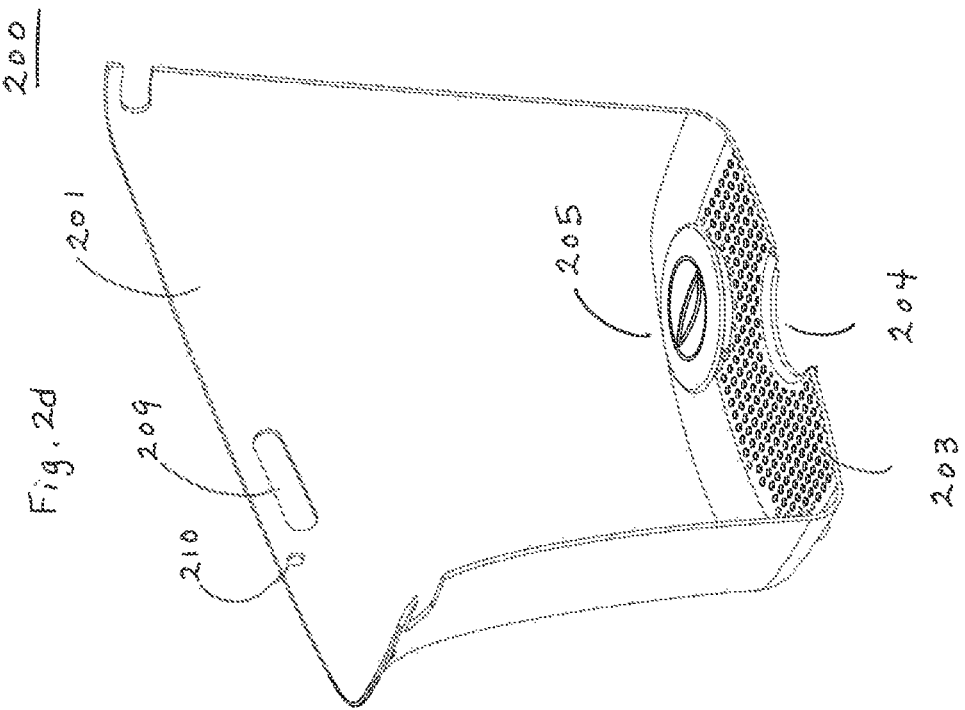
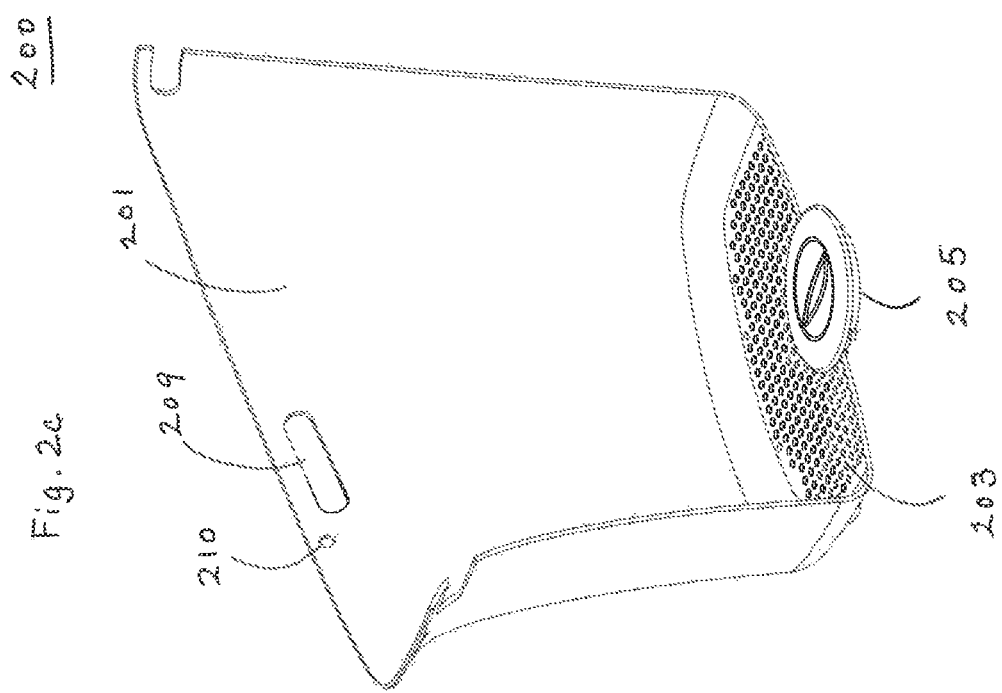

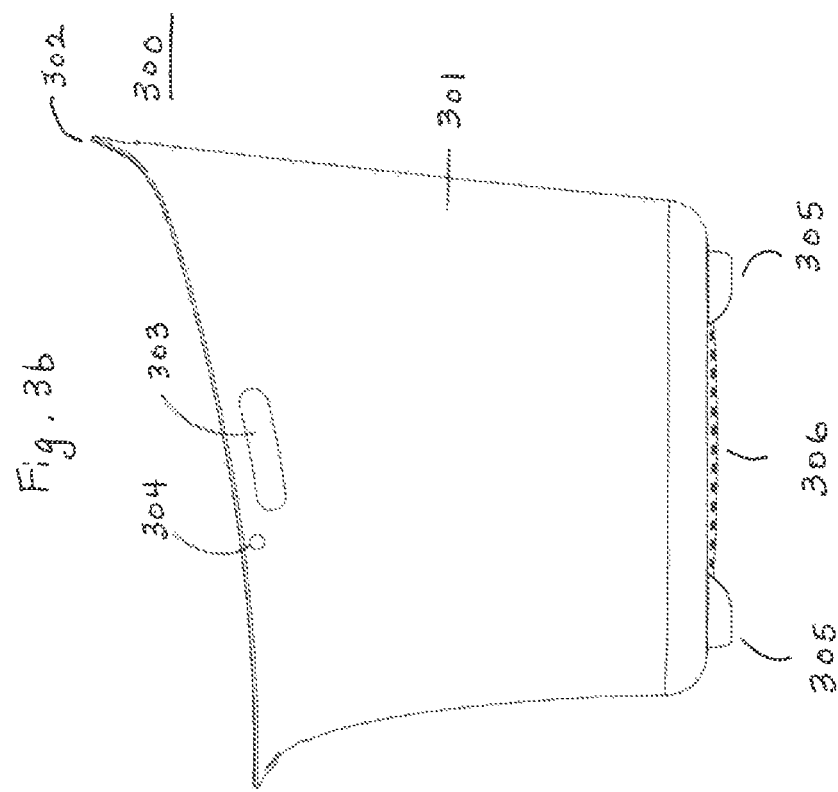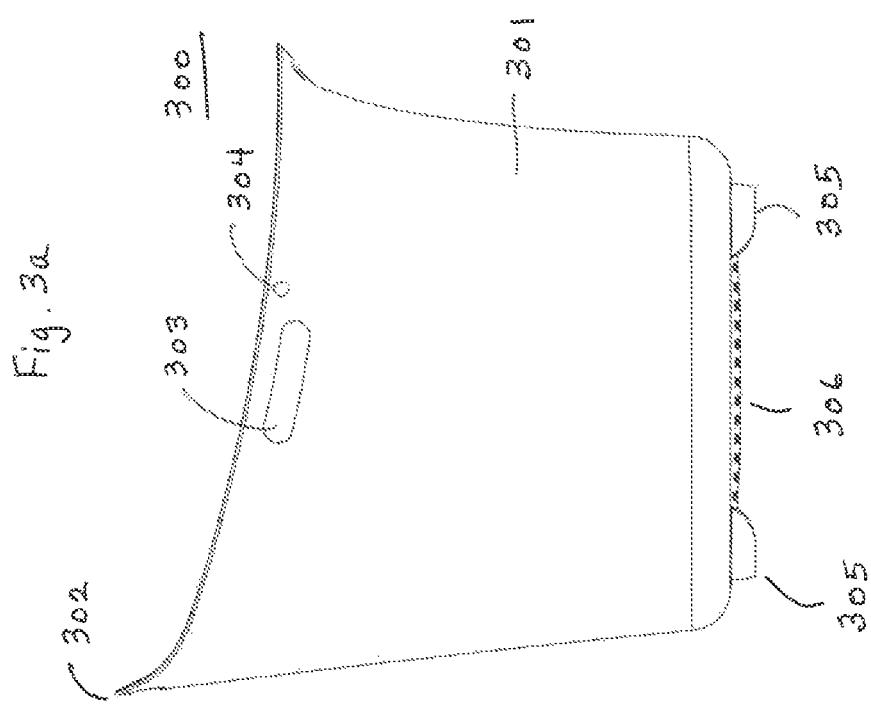

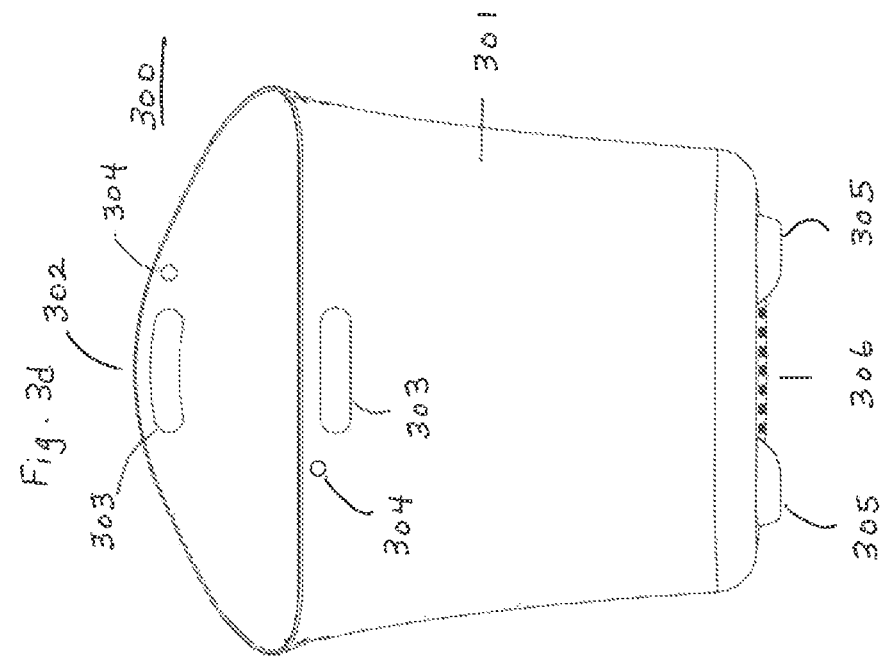
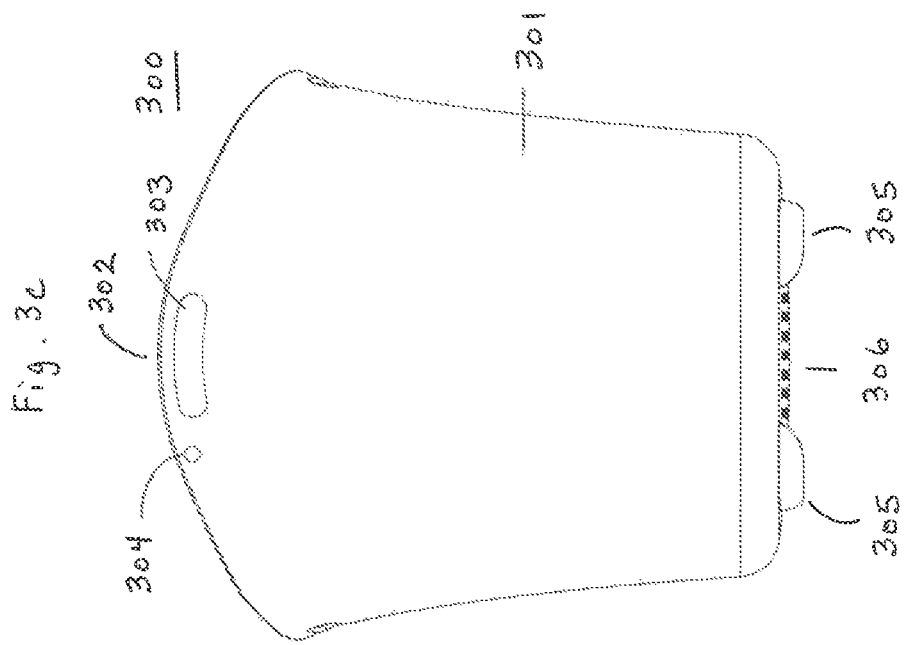

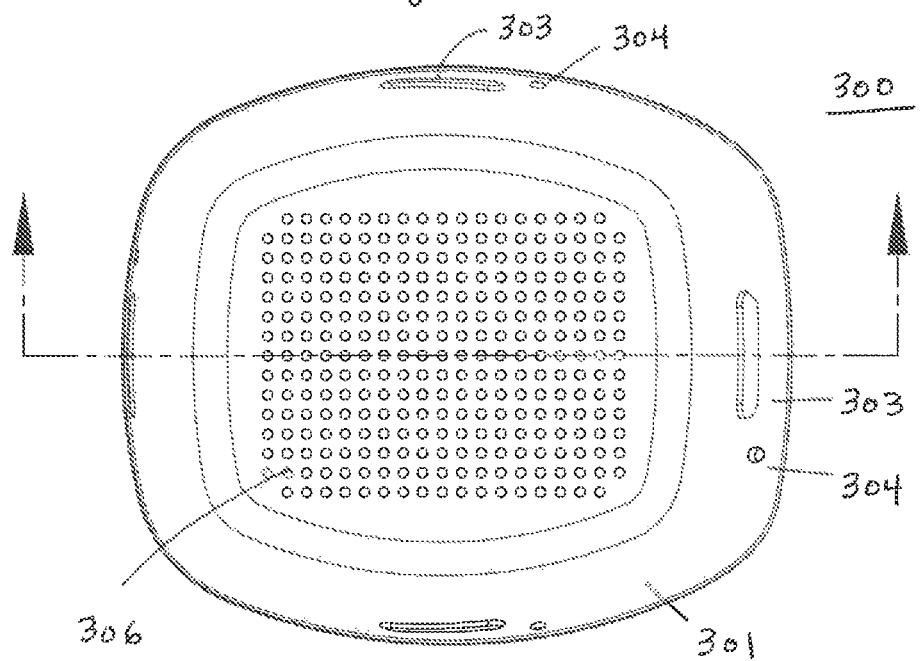
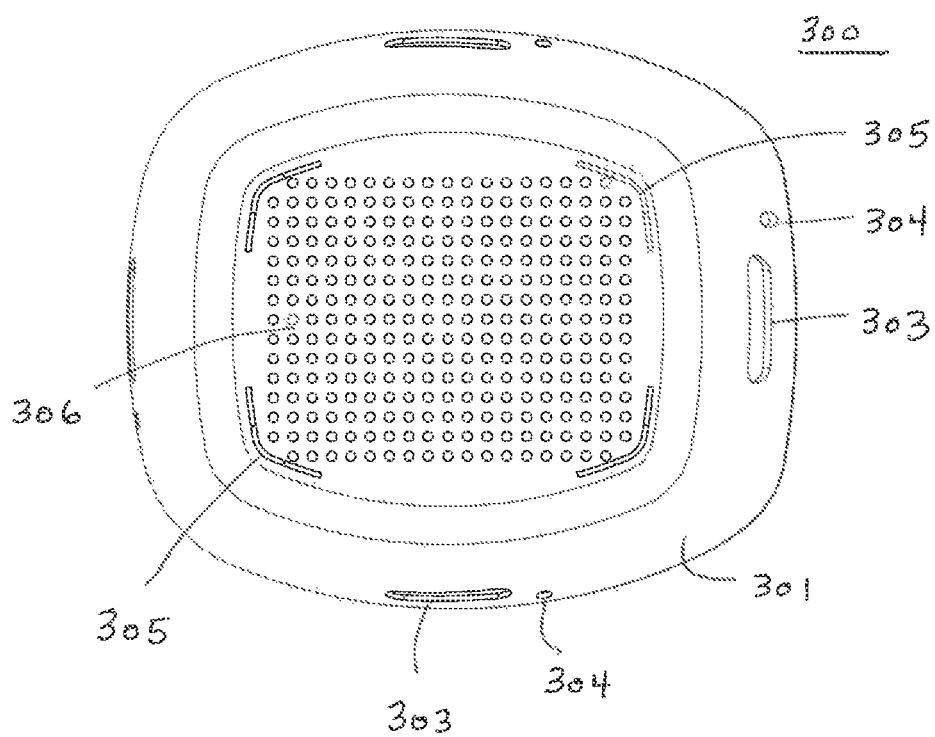

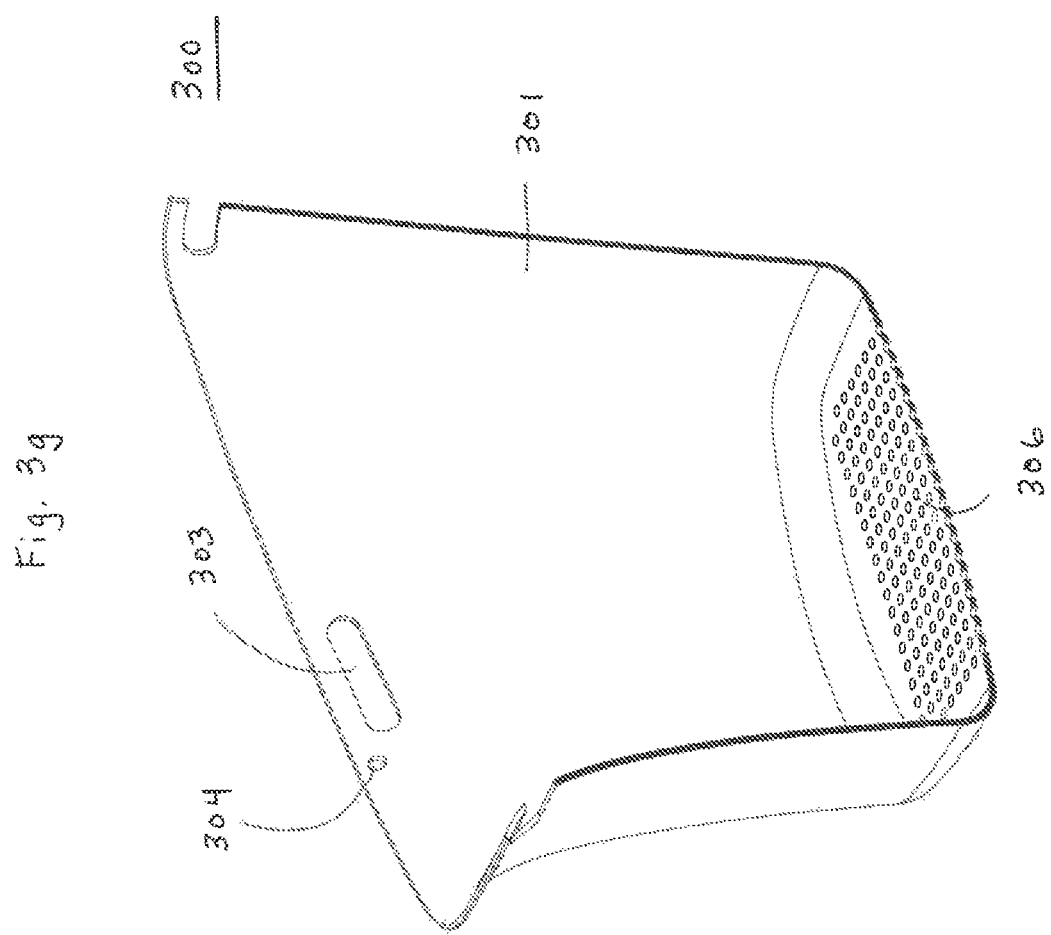

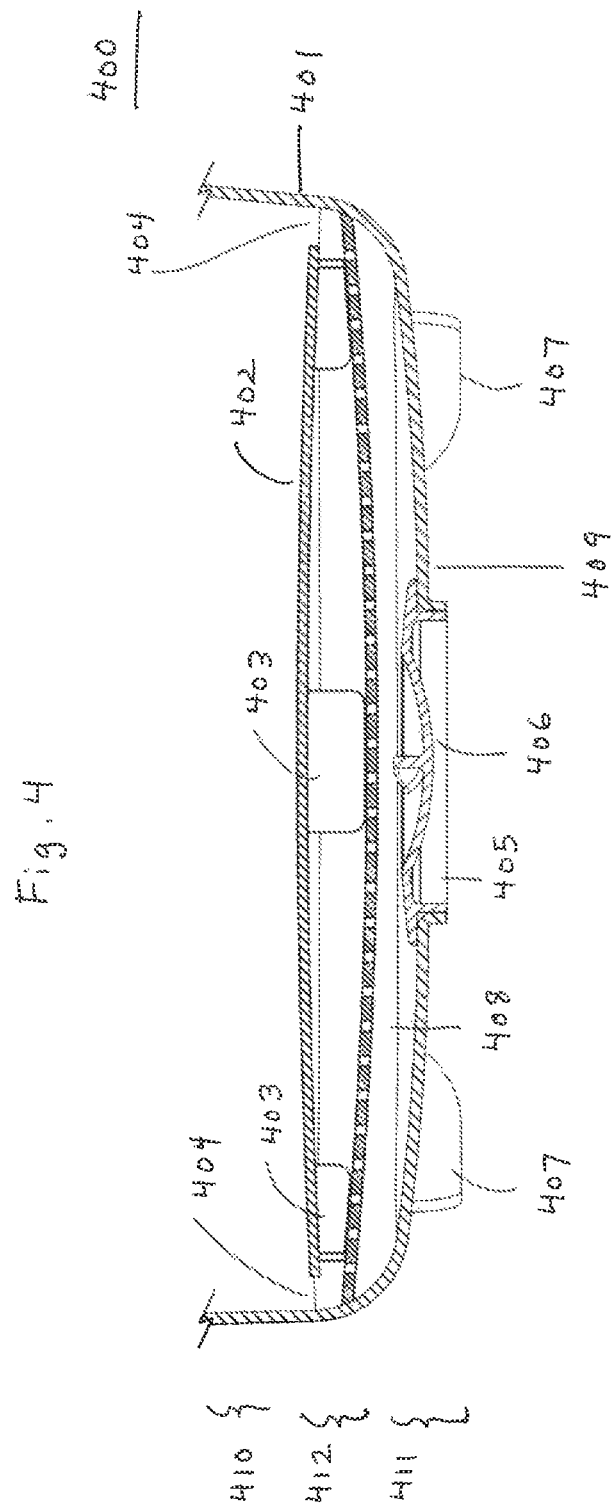

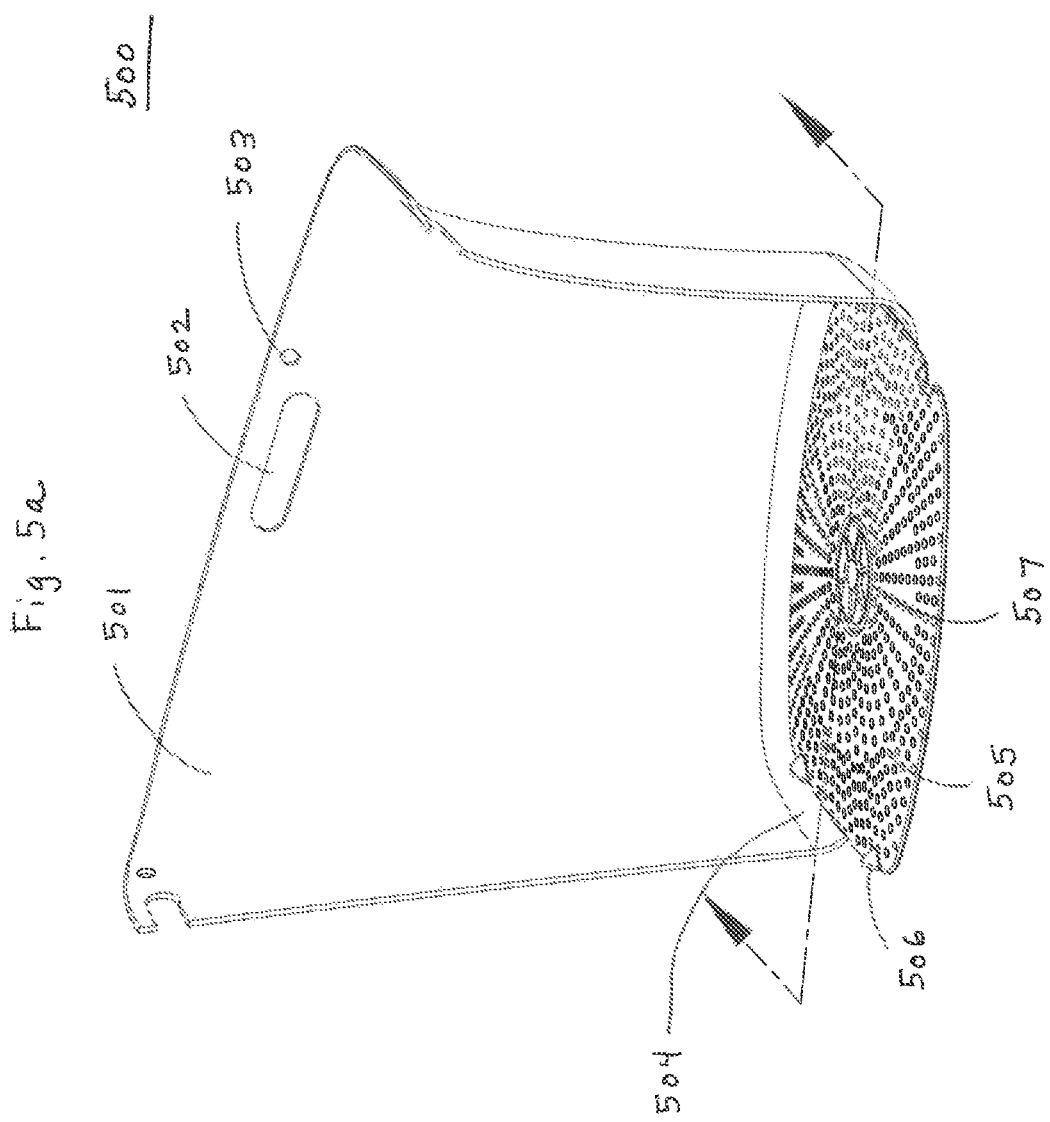

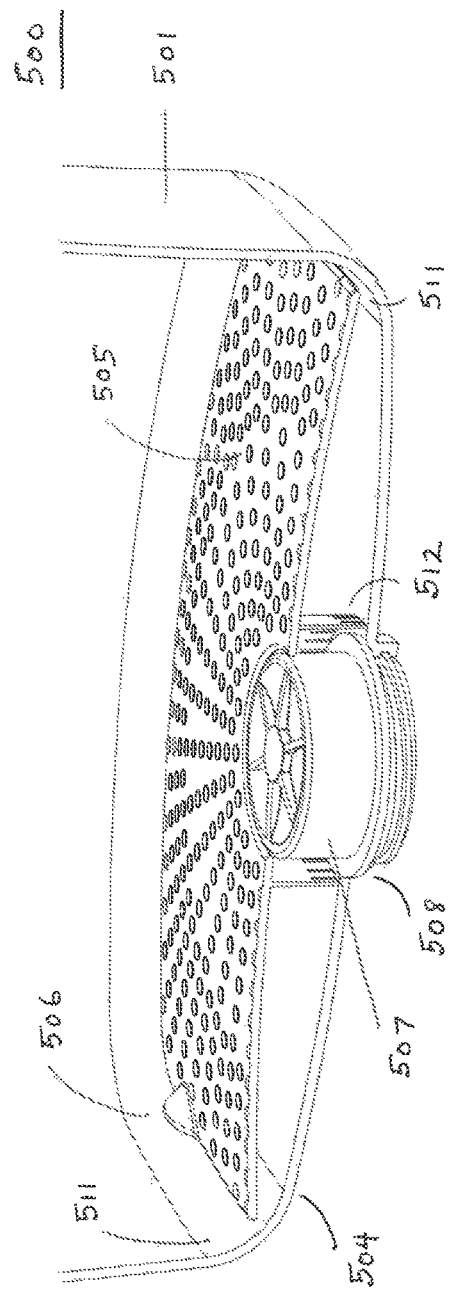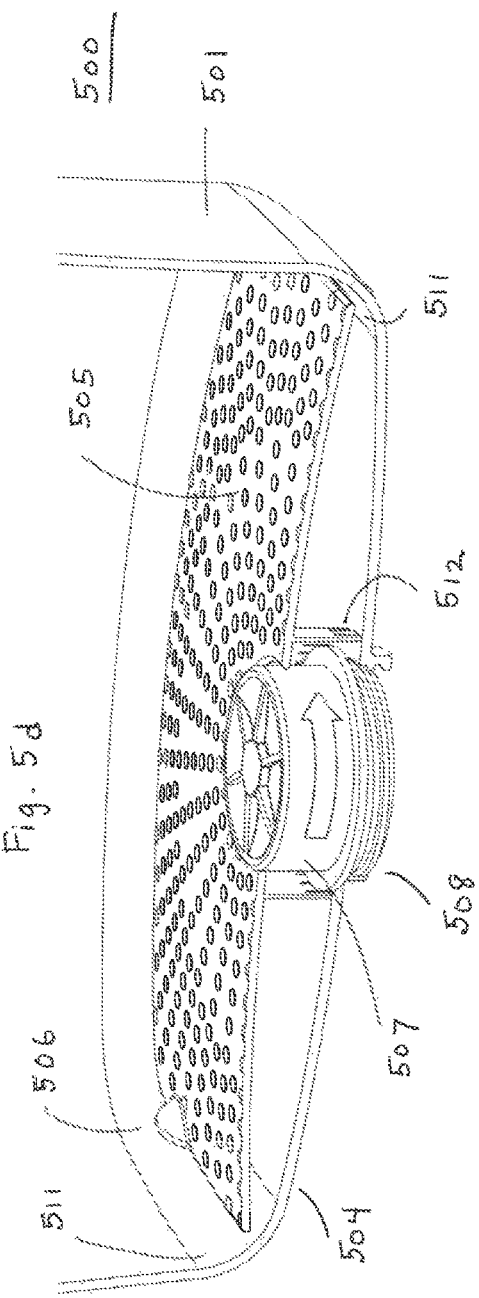

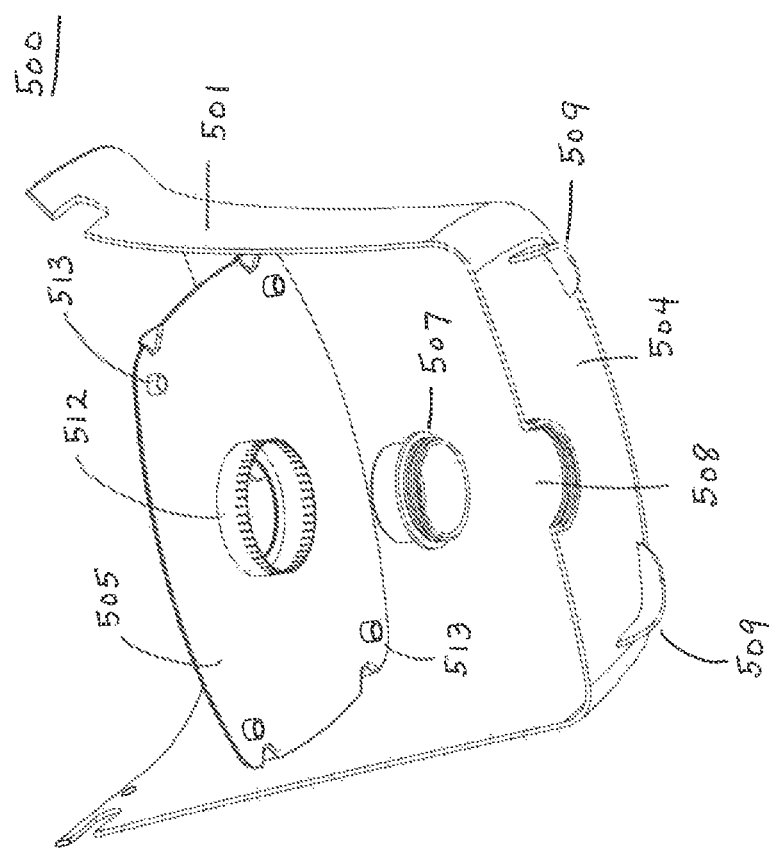
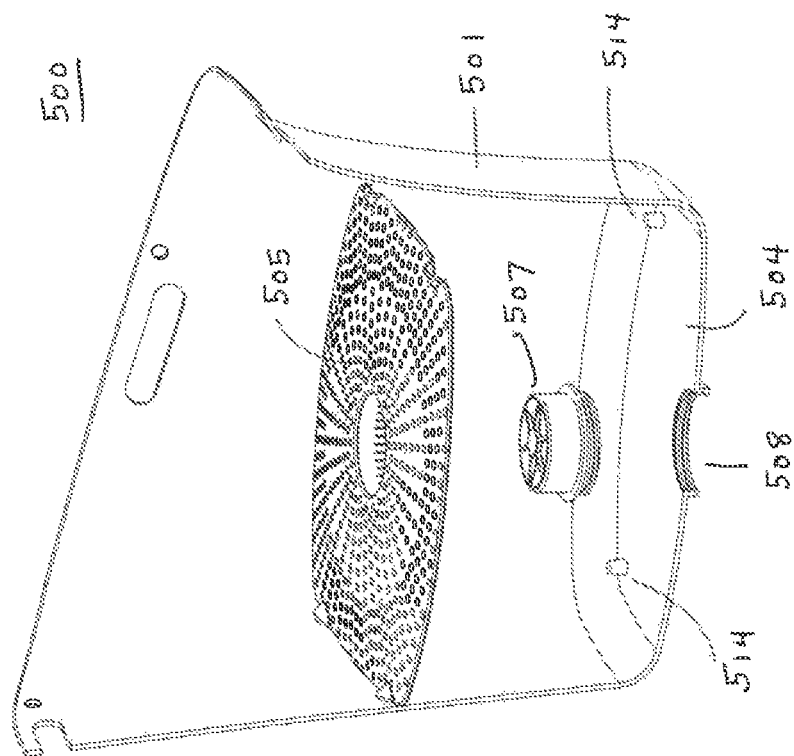

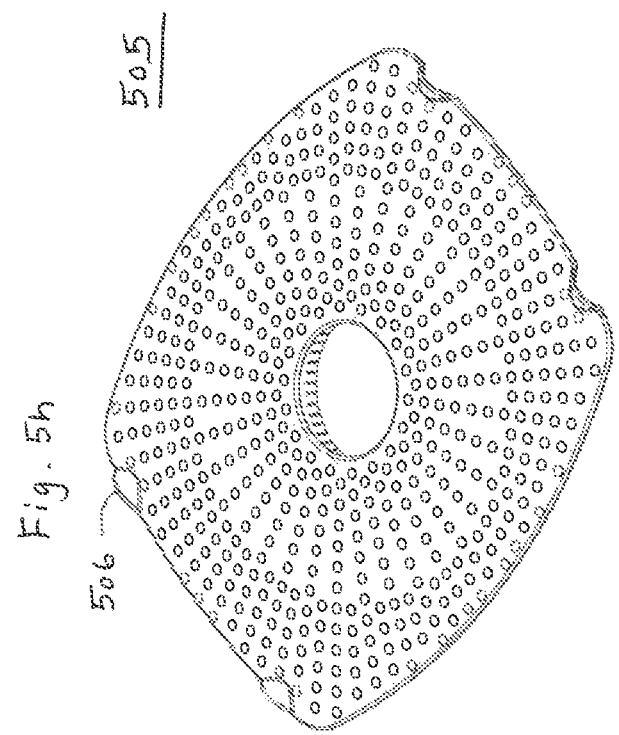
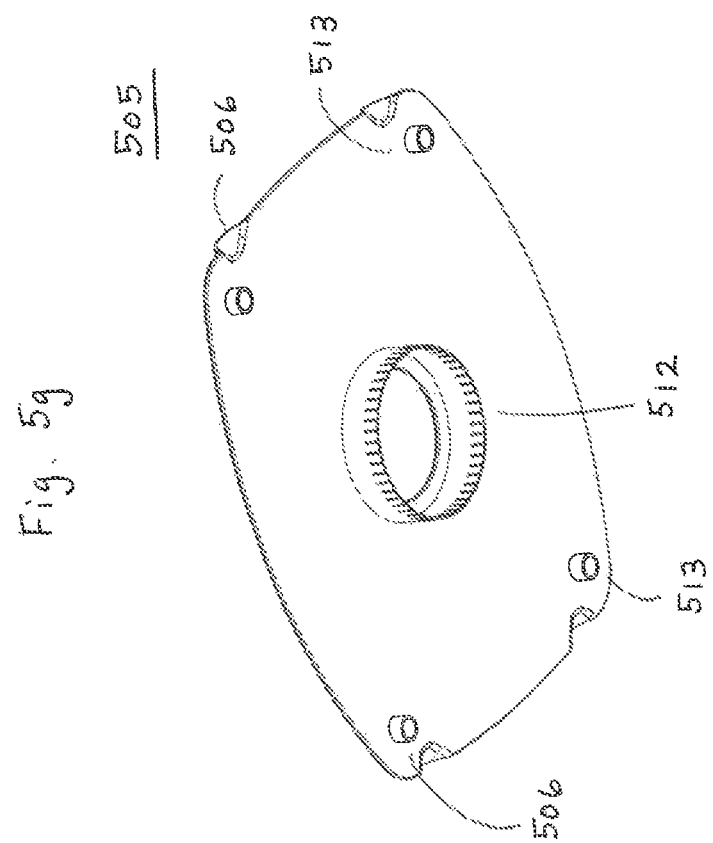

BATHING APPARATUS FOR COMPANION ANIMALS

The invention is directed towards an apparatus for bathing companion animals.

BACKGROUND

There exists a need for a device for bathing companion animals (pets), for instance cats, dogs, ferrets, teacups, puppies, kittens, and the like, which device provides ergonomic comfort to the owner and pet as well as sanitary conditions, while preventing damage to sinks, tubs stalls, counters, countertops and the like.

SUMMARY

Accordingly, disclosed is a bathing apparatus for a pet, the apparatus comprising a top section comprising walls to hold a pet; a bottom section adapted to support and seat the apparatus on a surface; and a bathing section situated between the top and bottom sections comprising a bathing floor configured for the pet to sit or stand on; wherein the bathing section is adapted to allow bathing water to flow away from the pet.

These and other features, aspects, and advantages of the disclosure will be apparent from a reading of the following detailed description together with the accompanying drawings, which are briefly described below. The invention includes any combination of two, three, four, or more of the disclosed embodiments as well as combinations of any two, three, four, or more features or elements set forth in this disclosure, regardless of whether such features or elements are expressly combined in a specific embodiment description herein. This disclosure is intended to be read such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

FIG. 1c is a left side view of a bathing apparatus, according to an embodiment.

FIG. 1d is a front view of a bathing apparatus, according to an embodiment.

FIG. 1e is a front view of a bathing apparatus, according to an embodiment.

FIG. 1f is a rear view of a bathing apparatus, according to an embodiment.

FIG. 2a is a cutaway view of a bathing apparatus according to an embodiment, showing a bathing floor.

FIG. 2b is a cutaway view of a bathing apparatus according to an embodiment, showing a bathing floor.

FIG. 2c is cutaway view of a bathing apparatus according to an embodiment, showing a drain in a bottom floor.

FIG. 2d is a cutaway view of a bathing apparatus according to an embodiment, showing a drain in a bottom floor.

FIG. 3a is a left side view of a bathing apparatus according to an embodiment.

FIG. 3b is a right side view of a bathing apparatus according to an embodiment.

FIG. 3c is a rear view of a bathing apparatus according to an embodiment.

FIG. 3d is a front view of a bathing apparatus according to an embodiment.

FIG. 3e is a top view of a bathing apparatus according to an embodiment.

FIG. 3f is a bottom view of a bathing apparatus according to an embodiment.

FIG. 3g is a cutaway view of a bathing apparatus according to an embodiment.

FIG. 4 is a cutaway view of a bathing apparatus according to an embodiment.

FIG. 5a is a cutaway view of a bathing apparatus according to an embodiment showing a bathing floor having an integrated drain.

FIG. 5c is a cutaway view of a bathing apparatus according to an embodiment showing a bathing floor with an integrated drain in a closed position.

FIG. 5d is a cutaway view of a bathing apparatus according to an embodiment showing a bathing floor with an integrated drain in an open position.

FIG. 5e is a cutaway top perspective view of a bathing apparatus according to an embodiment showing a bathing floor and an integrated drain.

FIG. 5f is a cutaway bottom perspective view of a bathing apparatus according to an embodiment showing a bathing floor and an integrated drain.

FIG. 5g is a bottom view of a bathing floor according to an embodiment.

FIG. 5h is a top view of a bathing floor according to an embodiment.

DETAILED DISCLOSURE

Figure 1A:
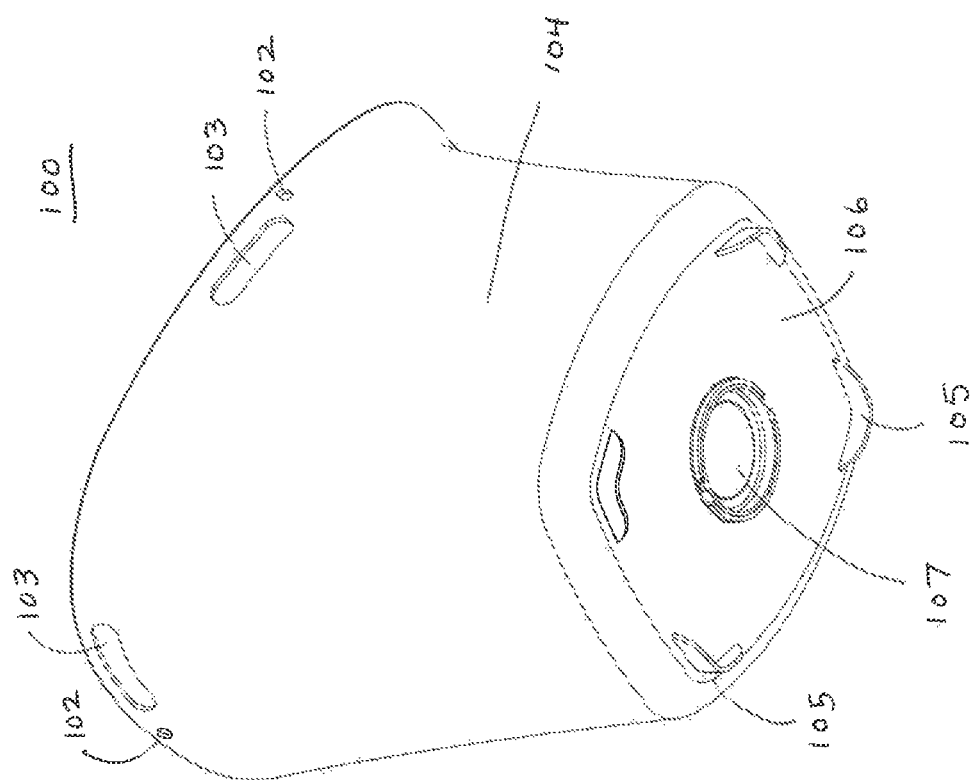
FIG. 1a is a top perspective view of a bathing apparatus, according to an embodiment.

In some embodiments, the apparatus is conveniently sized to fit within a kitchen sink or a bathtub. The apparatus may be configured to provide maximum ergonomic comfort to the bather (and pet). The apparatus may be lightweight, allowing the pet owner to wash the pet while standing at a sink, without bending over and without having to lift a heavy tub filled with water. The apparatus may comprise feet or legs (e.g. 3 or 4 feet or legs). The feet or legs may be adjustable, allowing for adjustment of a comfortable height of the bathing floor for use at a sink or in a tub. In some embodiments, the apparatus is foldable and may be easily stored.

In other embodiments, the bathing floor may be removable and adjustably placed in the apparatus, for instance to seat on adjustable or permanent tabs set at different heights on an interior of the walls. A bathing floor height may be adjusted for correct ergonomic use.

The apparatus may be configured to fit in any commercially available kitchen sink or any standard bathtub. The bottom section may comprise a non-slip base or non-slip feet that serve to secure it on a sink or tub bottom. The bottom section may for instance comprise 3 or 4 feet or may comprise a continuous base.

In certain embodiments, the bottom section base or feet may comprise a soft plastic so as not to damage the sink or tub bottom. In some embodiments, the bathing floor comprises a soft plastic, wherein the pet paws and/or claws grip the bathing floor and help hold the pet in place and provide comfort. The bathing floor may comprise a certain softer plastic while the remainder of the tub comprises another harder plastic.

The apparatus comprises a bathing floor configured for the pet to comfortably sit or stand on and configured to allow bathing water to be directed away from the pet. In the process of bathing a pet, a sink or tub drain may remain open so that bathing water may flow freely out, thus the apparatus may operate like a shower and not a bath. The pet then does not have to sit or stand in hair, debris or dirty water. According to an embodiment, the bathing floor in general defines the location of a "top" section and a "bottom" section. The bathing floor may be situated towards a bottom of the apparatus, towards a middle of the apparatus or towards a top of the apparatus. The term "flow away" from the pet in general means that bathing water will flow away from the pet and out of the apparatus.

The "walls" in general means 4 walls encompassing the entire apparatus. In other embodiments, there may only be 3, 2 or 1 wall. The walls may meet at a sharp angle or a curved angle. The walls may enclose the entire apparatus, meeting at a bottom thereof. Alternatively, the walls may not enclose the entire apparatus, for example, the bathing floor may be visible from the side with the walls supported or otherwise attached to the bathing floor. In some embodiments, the entire apparatus comprising 4 walls and a bottom floor may be continuous. In other embodiments, an apparatus may be discontinuous, for example comprising walls and no bottom floor or a removable bottom floor.

In some embodiments, the walls may comprise one or more tethers to hold a pet. In some embodiments, the walls may comprise one or more eyelets which may serve to hold a tether. There may for instance be 1, 2, 3 or 4 tethers or eyelets. In some embodiments, the walls may comprise one or more handles. In some embodiments, the handles may comprise eyelets. A handle may simply be a lateral opening in a wall. In some embodiments, a handle may be a molded-on part affixed to an exterior or an interior of a wall.

The "surface" in some embodiments means a sink or tub bottom surface or a shower stall bottom surface. A pet may also be conveniently bathed outdoors. Accordingly, a surface may mean an outdoors deck, patio or garden.

In some embodiments, the bathing floor may comprise a plurality of openings or holes configured to allow bathing water to flow through and away from the pet. In some embodiments, the bathing floor may comprise a support section and an outer section. In some embodiments, a bathing floor outer section may comprise openings or may itself be an opening configured to allow bathing water to flow away from the pet. The bathing floor may comprise a texture (textured) to provide comfort and grip for the pet. In other embodiments, the bathing floor may be smooth.

Any holes of a plurality of holes may be substantially circular, or may be other shapes. For instance, holes may be triangular, rectangular, square, oval, oblong, ovate, elliptic (elliptical), obovate, cuneate, deltoid and orbicular, among others.

A bathing floor may be an integral part of the apparatus and non-removable. In other embodiments, a bathing floor may be removed from the apparatus for cleaning. A bathing floor may be supported by tabs on the interior of the walls. A bathing floor may have feet or supports to support it on a bottom floor of the apparatus or on a surface (e.g. a sink or tub or outdoor surface).

In some embodiments, an outer section may comprise a screen that allows water flow and captures any hair or debris. In other embodiments, the bathing floor may be continuous with an outer section comprising a plurality of holes to allow water flow.

The bathing floor may comprise a front, back, left and right sections, wherein the one or more of the front, back, left and right sections comprise an outer section that allows for flow of the bathing water.

The bathing floor may be curved upward, (towards the pet), thus encouraging water, hair and debris to flow freely away from pet and toward a bathing floor outer section. The term "curved upward" means convex in a vertical direction, not unlike an outer surface of a contact lens. Hair, dirt, debris and water may flow towards the outer section, situated towards the perimeter of the bathing section. The outer section may contain a screen or a plurality of holes that allows water flow and traps hair and debris. In other embodiments, the bathing floor may comprise a plurality of holes to allow water flow. A "curved upward" bathing floor will encourage water flow away from the pet.

In some embodiments, the apparatus may comprise a bottom floor in a bottom section. A bottom floor may comprise a plurality of holes and/or a drain to allow water flow. In some embodiments, the apparatus may comprise a sub-floor within the bottom section beneath the bathing floor, which may have a plurality of holes and/or a drain section to allow water flow. A sub-floor may be situated between a bathing floor and a bottom floor. A sub-floor may be substantially parallel with the bathing floor. A sub-floor and/or bottom floor may be also be curved. A sub-floor may be curved upward or downward. The sub-floor and/or bottom floor may be curved downward toward a sink or tub bottom to encourage water collection and/or water flow, for example water flow towards a drain. In some embodiments, there may be more than one, for instance two, sub-floors. A sub-floor and/or bottom floor may be curved downward and towards a drain, for instance towards a center drain.

In general, floors are generally parallel with a sink or tub floor, and walls are generally perpendicular with the floor or floors.

In some embodiments, a sub-floor, bottom floor or the bathing floor may contain a drain plug adapted to open or close a drain in a bottom floor. Such a drain plug may comprise a "turn handle" having a grip or a tab, which may be essentially flush with the bathing and/or sub-floor and/or bottom floor. A drain plug and drain may be essentially circular in shape. Other suitable means may be employed and adapted to open and close a drain in a bottom floor. A drain may comprise a screen to capture hair and debris.

A bathing floor comprising a drain plug adapted to open and/or close a drain in a bottom floor may be called an "integrated drain". An integrated drain allows a pet owner to give a pet a bath and open the drain and allow water to drain away from the pet without having to lift the pet out of the apparatus. A top of a drain plug of an integrated drain may comprise a surface similar to the bathing floor surface for pet comfort and stability.

Other means of accessing the drain from above the bathing floor are possible. In some embodiments, a drain plug may be attached to a chain accessible from above the bathing floor. In other embodiments, a moveable rod may be associated with a drain plug and configured to open and close the drain and accessible from above the bathing floor.

In embodiments wherein the apparatus comprises a bottom floor with a drain that may be opened or closed, the bottom floor drain may be closed to allow the top section to fill or partially fill with water. In this embodiment, the top section comprises 4 walls. Thus, a present bathing apparatus may be adapted to be employed as both a shower and a bath. After a bath, the bottom floor drain may be opened to allow water to escape towards the sink or tub, without lifting the pet directly from dirty water. The drain may be configured to have small holes so that hair, debris and the like do not escape to the sink or tub.

A screen and/or sub-floor comprising a plurality of holes and/or drain will prevent dogging of the sink or tub. In some embodiments, the holes are essentially uniform in size. In some embodiments, the screen and/or sub-floor holes or drain may be of a size so that parasites such as fleas or brown ticks are retained during washing/rinsing with water.

In some embodiments, no outer section screen or no outer section holes or no sub-floor or no bottom floor is required. For instance, the apparatus may have 3 walls with the bathing floor slightly tilted towards the front to allow water flow away from the pet.

In some embodiments, the apparatus may comprise a sub-floor below the bathing floor. The sub-floor may be adapted to collect bathing water and/or to allow water to pass through towards the sink or tub. For instance, the sub-floor may comprise one or more holes or drains or may comprise a plurality of holes. In some embodiments, a sub-floor may resemble a colander. In other embodiments, the apparatus may comprise a bathing floor and a bottom floor wherein the bottom floor may be a continuous material with a single drain. The drain may be a hole, or may comprise holes in order to collect hair, debris and the like. The drain may be situated near the center of the bottom floor.

A pet in general means a companion animal, and may be in some embodiments be a cat, dog, puppy, kitten, or small dog or cat or exotic.

In some embodiments, the apparatus is formed of a lightweight sturdy thermoplastic polymer. The thermoplastic may comprise for instance polyurethane, polypropylene, polyethylene, polystyrene or a mixture thereof. In certain embodiments, the plastic is recyclable. In other embodiments, the entire apparatus is formed of a single plastic and is entirely recyclable. In other embodiments, the apparatus may comprise two or more different plastics. The plastic may have incorporated therein an antimicrobial compound.

In some embodiments, the walls comprise a section extending upward away from the bathing floor, also referred to herein as a "sail". A sail is adapted to prevent water splash. In some embodiments a sail may extend from a rear wall to prevent backsplash of water. A sail may also encourage a pet to face front and make a pet feel more secure. A sail may comprise one or more handles and/or tethers and/or eyelets. In some embodiments a sail may comprise an eyelet situated near a top of the sail to allow for attachment of a tether or leash. In some embodiments, a sail may extend up to twice as high as an adjacent wall or higher.

A filter section coupled to a bathing floor may comprise a plurality of holes and/or slots and is configured to collect hair and debris. A filter section may be adapted to couple to a drain.

Figure 1B:
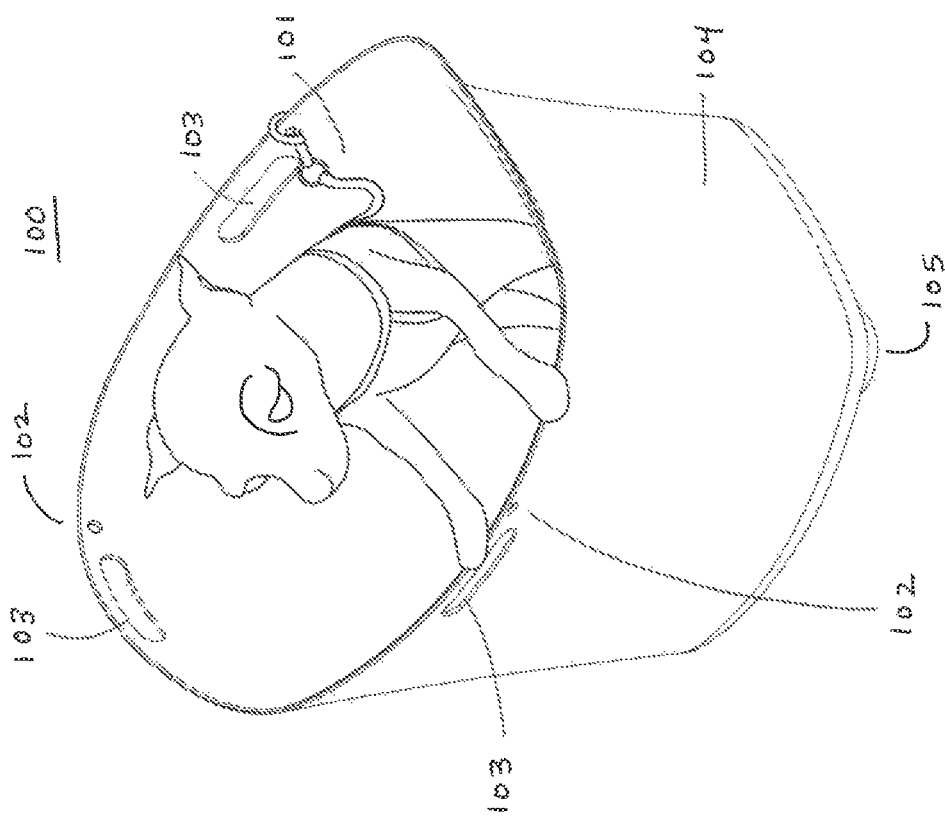
FIG. 1b is a bottom perspective view of a bathing apparatus, according to an embodiment.
Figure 1G:
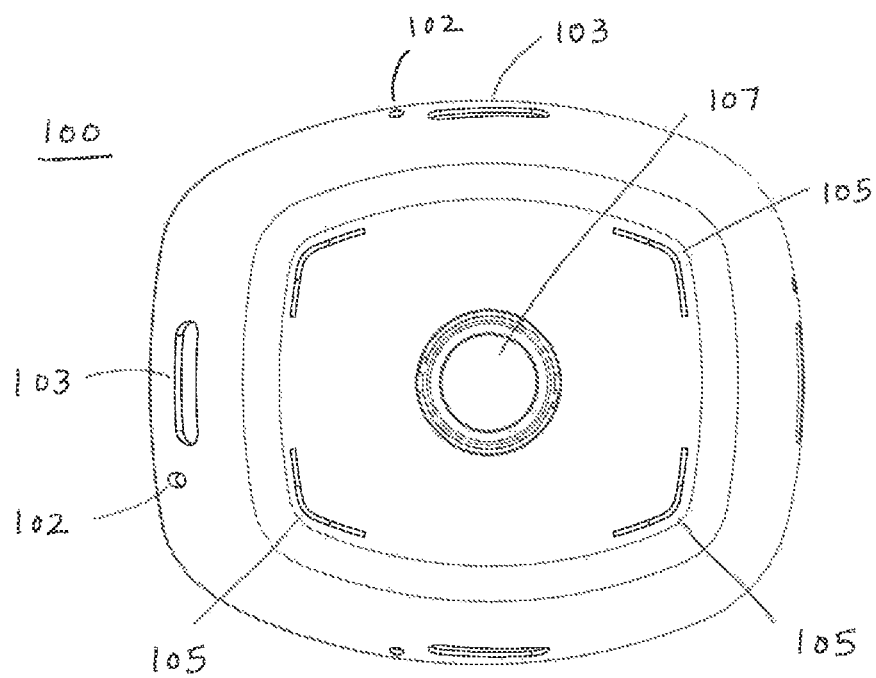
FIG. 1g is a bottom view of a bathing apparatus, according to an embodiment.
Figure 1H:
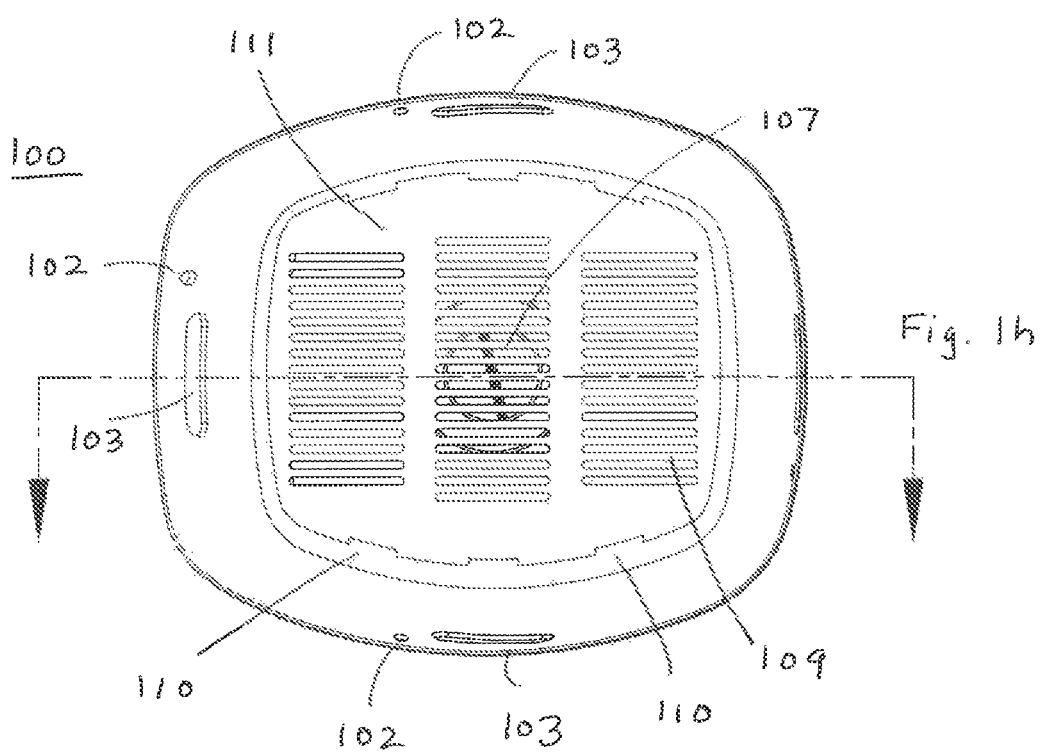
FIG. 1h is a top view of a bathing apparatus, according to an embodiment.

Turning now to the figures, FIG. 1*a* shows a bathing apparatus 100 according to an embodiment with a small dog inside (*Canis lupus familiaris*). Visible is a tether 101, eyelets 102 and handles 103. FIG. 1*b* represents an apparatus 100 bottom view. Visible are walls 104, feet 105, a bottom floor 106 and drain 107. FIG. 1*c* and FIG. 1*d* are left and right side views. Visible are feet 105, drain 107, handle 103 and eyelet 102. The apparatus comprises a sail section 108 to prevent backsplash of water from the pet FIG. 1*e* and FIG. 1*f* are front and back views of apparatus 100. FIG. 1*g* is a bottom view of apparatus 100. Shown are drain 107, feet 108, handles 103 and eyelets 102. FIG. 1*h* is a top view of apparatus 100. Visible is a bathing floor 111. Features 109 may represent a textured surface of the bathing floor 111. Alternatively, features 109 may be a plurality of holes to allow water flow. Features 109 may both be a plurality of holes and provide a textured surface, for examples, holes having a raised lip around them. Also shown are eyelets 102, handles 103 and drain 107. Also shown are openings 110 in an outer section of the bathing floor, which allow water flow away from the pet and out of the apparatus.

Figure 1I:
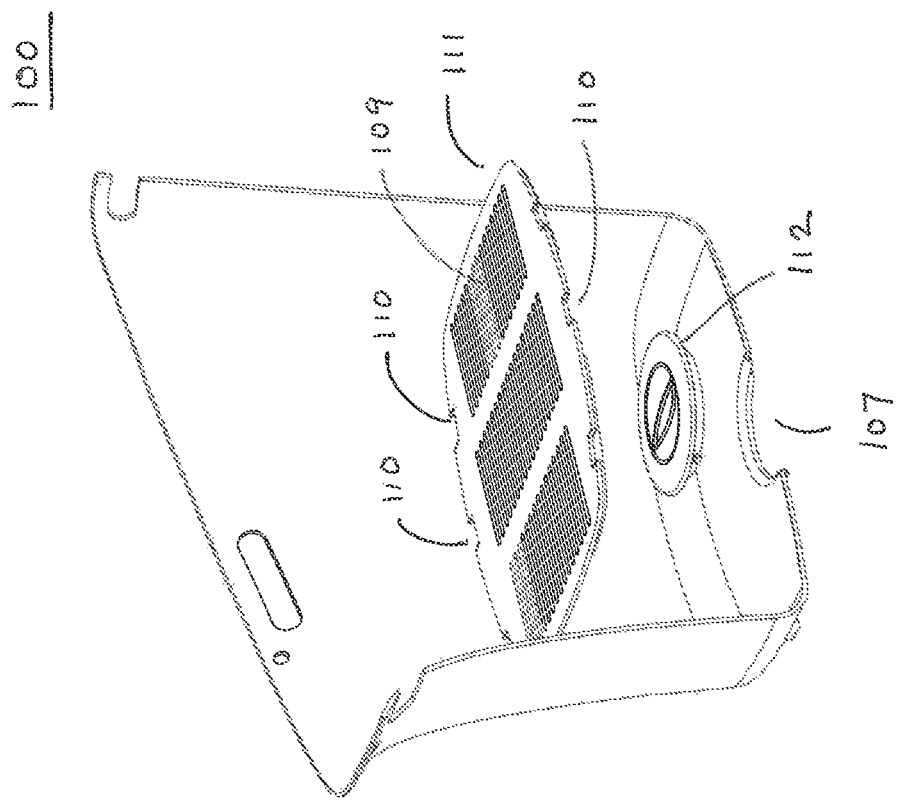
FIG. 1i is cutaway view of a bathing apparatus according to an embodiment, showing a bathing floor.
Figure 1J:
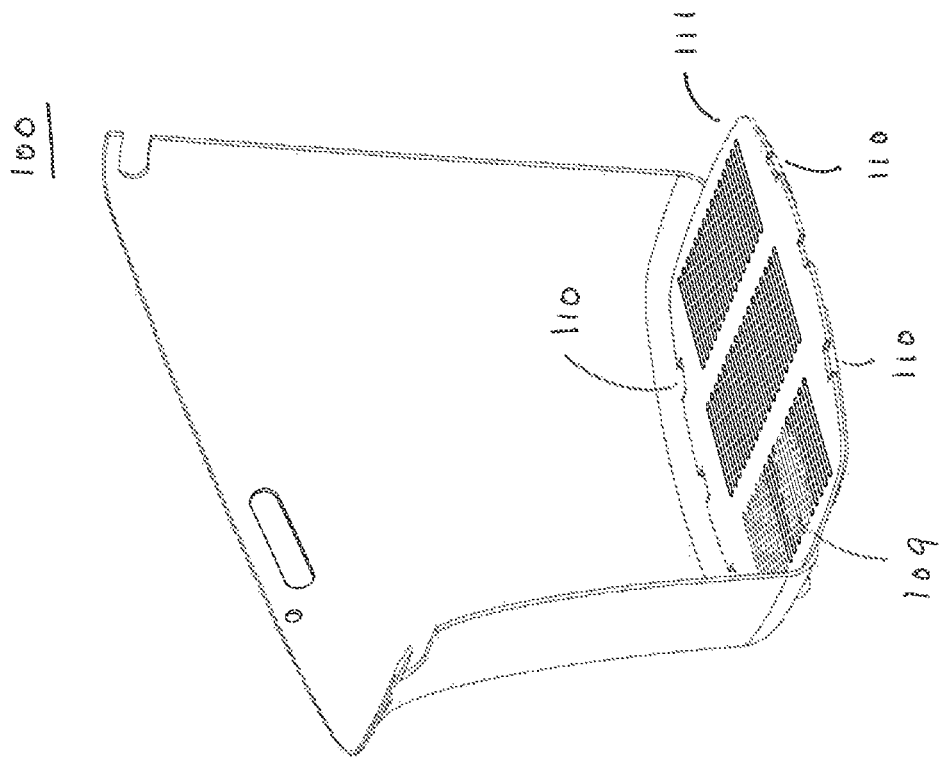
FIG. 1j is a cutaway view of a bathing apparatus according to an embodiment, showing a bathing floor and a drain.

FIG. 1*i* and FIG. 1*j* show a cutaway view of bathing apparatus 100. Visible are bathing floor 111, openings 110, features 109 and drain 107. Also shown is drain plug 112, configured to open and close drain 107.

FIG. 2*a* and FIG. 2*b* show a cutaway front view of another bathing apparatus 200 according to an embodiment. Shown are walls 201, feet 202 on a bottom floor 203, drain 204 and drain plug 205. Bottom floor 203 is curved downward. In FIG. 2*a*, bathing floor 206 is flat. In FIG. 2*b*, bathing floor 206 is curved upward. A bathing floor outer section 207 is open allowing water flow away from the pet and out of the apparatus. Bathing floor 206 comprises feet 208 to seat the bathing floor on the bottom floor. FIG. 2*c* and FIG. 2*d* are cutaway views of bathing apparatus 200. Shown are walls 201, drain 204, drain plug 205, handles 209, eyelets 210 and textured bottom floor 203. A bottom floor may be curved downward and towards a center drain 204.

FIG. 3*a* and FIG. 3*b* are left and right side views of another embodiment of a bathing apparatus 300. Shown are walls 301, sail section 302, handles 303, eyelets 304, feet 305 and bottom floor 306. The bottom floor 306 is curved downward and comprises a plurality of holes to allow water flow away from a pet and out of the apparatus. FIG. 3*c* and FIG. 3*d* are rear and front views of apparatus 300. FIG. 3*e* and FIG. 3*f* are top and bottom views of apparatus 300. Shown are walls 301, handles 303, eyelets 304, feet 305 and bottom floor 306 comprising a plurality of holes. FIG. 3*g* is a cutaway depiction of bathing apparatus 300 showing bottom floor 306. A bathing floor is not present and may be placed within (and removed from) the apparatus.

FIG. 4 shows a cutaway view of a bathing apparatus 400. In this embodiment, walls 401 are continuous with bottom floor 409. Bottom floor 409 is curved downward and towards drain 405. Bottom floor 409 comprises feet 407 to seat the apparatus on a surface. The drain 405 is shown closed by drain plug 406. Bathing floor 402 is curved upward. An outer section 404 is open to allow water to flow off of and away from a pet. Outer section 404 is a continuous open section. Bathing floor 402 comprises feet 403 which sit on a sub-floor 408. Sub-floor 408 is curved downward and comprises a plurality of holes to allow water flow. Drain plug 406 may be placed in a closed position to allow apparatus 400 to fill with water to provide a bath. Alternatively, drain plug 406 may be placed in an open position to allow apparatus 400 to be used as a shower. FIG. 4 shows a top section 410, bottom section 411 and bathing section 412.

Figure 5B:
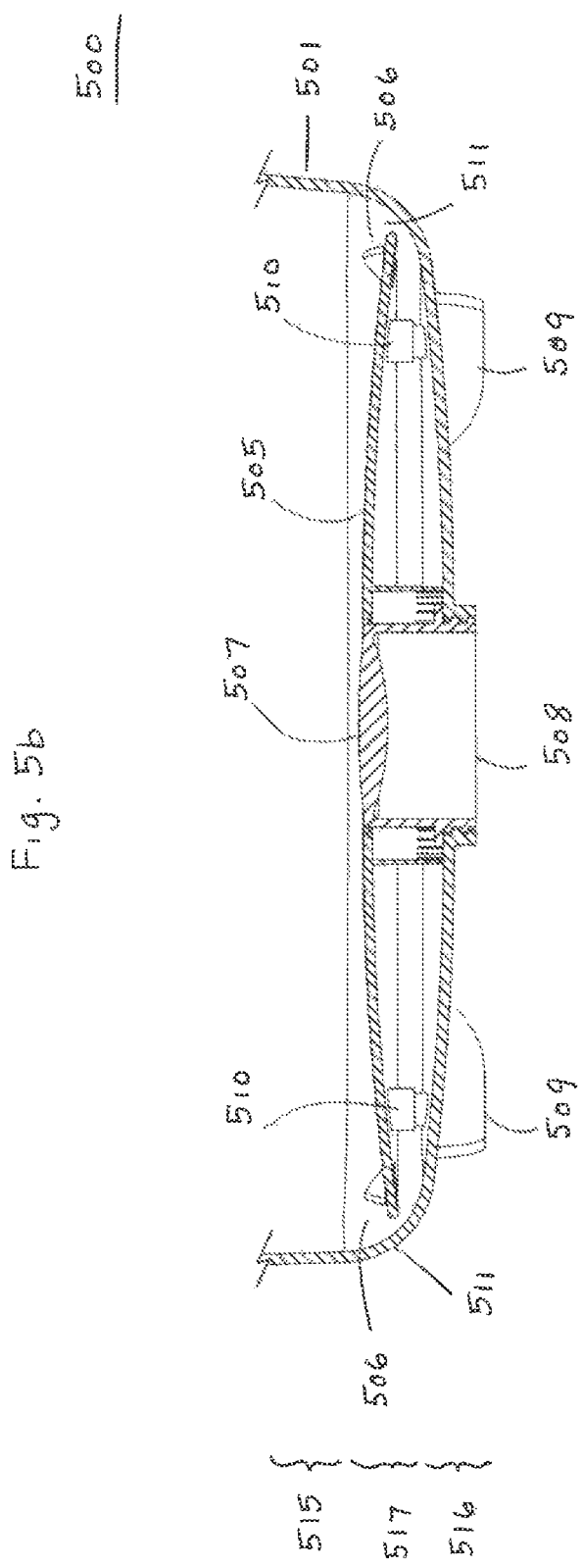
FIG. 5b is a cutaway view of a bathing apparatus according to an embodiment showing a bathing floor with an integrated drain.

FIG. 5a shows apparatus 500 comprising walls 501, handle 502, eyelet 503, bottom floor 504 and bathing floor 506. Bathing floor 505 is adapted with a drain plug 507 which connects to a drain in the bottom floor 504 (not shown). Bathing floor 505 is textured to provide comfort to the pet. Bathing floor 505 comprises handles 506 to allow for placement and removal. FIG. 5b shows bathing apparatus 500 in a cutaway view. Visible are handles 506, feet 509, drain 508, drain plug 507, bathing floor 505. Bathing floor 505 comprises feet 510 to seat it on bottom floor 504. Feet 510 comprise a male/female plug configuration with female on top. A male/female configuration may be female on top or female on bottom. An outer section 511 is open to allow water to flow away from the pet. Outer section 511 is a continuous open section. A filter section 512 coupled to the bathing floor is visible, containing a plurality of openings to allow water flow and to couple with the drain 508. FIG. 5b shows a top section 515, a bottom section 516 and a bathing section 517.

FIG. Sc and FIG. 5d show cutaway views of apparatus 600 showing drain plug 507 in a closed and open position. In an open position, water will flow through filter section 512 and out of the apparatus.

FIG. Re and FIG. 5f are cutaway views of bathing apparatus 500. Visible are a filter section 512 coupled to a textured bathing floor 606. Also shown are a drain plug 507, drain 508, female foot connectors 55 and male foot connectors 514. FIG. 5g and FIG. 5h shows textured bathing floor 505 having handles 506 and coupled to a filter section 512. FIG. 5a through FIG. 5f show an integrated drain accessible from the top of the bathing floor.

Following are some embodiments of the invention.

In a first embodiment, disclosed is a bathing apparatus for a pet, comprising a top section comprising walls to hold a pet; a bottom section adapted to support and seat the apparatus on a surface; and a bathing section situated between the top and bottom sections comprising a bathing floor configured for the pet to sit or stand on; wherein the bathing section is adapted to allow bathing water to flow away from the pet.

In a second embodiment, disclosed is a bathing apparatus according to the first embodiment, wherein the bathing section comprises a bathing floor and an outer section adapted to allow water to flow through.

In a third embodiment, disclosed is a bathing apparatus according to embodiments 1 or 2, wherein the bathing section comprises an outer section which comprises a plurality of holes that allows water to flow through.

In a fourth embodiment, disclosed is an apparatus according to any of the preceding embodiments, wherein the bathing section comprises an outer section adapted to allow water to flow through, wherein the outer section is a continuous open section. In a fifth embodiment, disclosed is a bathing apparatus according to any of the preceding embodiments, wherein the bathing floor comprises a plurality of holes adapted to allow water to flow through.

In a sixth embodiment, disclosed is a bathing apparatus according to any of the preceding embodiments, wherein the bathing floor is curved upward. In a seventh embodiment, disclosed is a bathing apparatus according to any of the preceding embodiments, comprising a bottom floor below the bathing floor, the bottom floor adapted to collect bathing water and/or to allow bathing water to pass through the bottom floor.

In an eighth embodiment, disclosed is a bathing apparatus according to any of the preceding embodiments, comprising a bottom floor below the bathing floor, the bottom floor containing a drain. In a ninth embodiment, disclosed is a bathing apparatus according to any of the preceding embodiments, comprising a bottom floor below the bathing floor, the bottom floor containing a drain adapted to allow water to flow through and to collect hair or debris.

In a tenth embodiment, disclosed is a bathing apparatus according to any of the preceding embodiments, comprising bottom floor below the bathing floor, the bottom floor containing a drain, wherein the drain is adapted to be placed in an open or a closed position. In an eleventh embodiment, disclosed is a bathing apparatus according to any of the preceding embodiments, wherein the bathing floor is coupled to a filter section.

In a twelfth embodiment, disclosed is a bathing apparatus according to any of the preceding embodiments, comprising a bottom floor, wherein the bottom floor is curved downward. In a thirteenth embodiment, disclosed is a bathing apparatus according to any of the preceding embodiments, comprising a bottom floor comprising a plurality of holes adapted to allow water to pass through.

In a fourteenth embodiment, disclosed is a bathing apparatus according to any of the preceding embodiments, comprising a bottom floor with a drain adapted to be placed in a closed or open position to allow the apparatus to hold water to provide a bath or to allow water to pass through to provide a shower.

In a fifteenth embodiment, disclosed is a bathing apparatus according to any of the preceding embodiments, comprising a bottom floor comprising a drain adapted to be placed in a closed or open position and a drain plug adapted to close or open the drain, wherein the drain plug is accessible from the bathing floor, i.e. an integrated drain.

In a sixteenth embodiment, disclosed is a bathing apparatus according to any of the preceding embodiments, comprising a sub-floor and a bottom floor, the sub-floor containing a plurality of holes to allow water flow and/or to collect hair or debris. In a seventeenth embodiment, disclosed is a bathing apparatus according to any of the preceding embodiments, comprising a sub-floor and a bottom floor, wherein the sub-floor is curved upward.

In an eighteenth embodiment, disclosed is a bathing apparatus according to any of the preceding embodiments, wherein bathing section comprises an outer section comprising a screen that allows water flow. In a nineteenth embodiment, disclosed is a bathing apparatus according to any of the preceding embodiments, wherein the top section comprises 3 or 4 walls.

In a twentieth embodiment, disclosed is a bathing apparatus according to any of the preceding embodiments, wherein the bottom section comprises 3 or 4 feet or legs. In a twenty-first embodiment, disclosed is a bathing apparatus according to any of the preceding embodiments, wherein the height of the bathing floor relative to a sink or tub bottom is adjustable.

In a twenty-second embodiment, disclosed is a bathing apparatus according to any of the preceding embodiments, wherein the walls comprise one or more tethers to hold the pet. In a twenty-third embodiment, disclosed is a bathing apparatus according to any of the preceding embodiments, wherein the walls comprise one or more eyelets.

In a twenty-fourth embodiment, disclosed is a bathing apparatus according to any of the preceding embodiments, wherein the walls comprise one or more handles. In a twenty-fifth embodiment, disclosed is a bathing apparatus according to any of the preceding embodiments, wherein the bathing floor is textured.

In a twenty-sixth embodiment, disclosed is a bathing apparatus according to any of the preceding embodiments, wherein the walls comprise a rear wall extending upward from the bathing section and configured to prevent backsplash.

In a twenty-seventh embodiment, disclosed is a bathing apparatus according to any of the preceding embodiments, wherein the apparatus comprises a plurality of holes situated in an outer section, in a bathing floor, in a bottom floor, in a drain, or in a sub-floor. In some embodiments, holes may be substantially circular (round) or may be another shape. Some shapes are more effective at collecting pet hair than others and some are more easily cleaned than others.

The term "coupled" means that an element is "attached to" or "associated with" another element. Coupled may mean directly coupled or coupled through one or more other elements. An element may be coupled to an element through two or more other elements in a sequential manner or a non-sequential manner. The term "via" in reference to "via an element" may mean "through" or "by" an element. Coupled or "associated with" may also mean elements not directly or indirectly attached, but that they "go together" in that one may function together with the other.

The term "towards" in reference to a of point of attachment, may mean at exactly that location or point or, alternatively, may mean closer to that point than to another distinct point, for example "towards a center" means closer to a center than to an edge.

The term "like" means similar and not necessarily exactly like. For instance "ring-like" means generally shaped like a ring, but not necessarily perfectly circular.

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±0.05%, ±0.1%, ±0.2%, ±0.3%, ±0.4%, ±0.5%, ±1%, ±2%, ±3%, ±4%, ±5%, ±6%, ±7%, ±8%, ±9%, ±10% or more. All numeric values are modified by the term "about" whether or not explicitly indicated. Numeric values modified by the term "about" include the specific identified value. For example "about 5.0" includes 5.0.

The term "substantially" is similar to "about" in that the defined term may vary from for example by ±0.05%, ±0.1%, ±0.2%, ±0.3%, ±0.4%, ±0.5%, ±1%, ±2%, ±3%, ±4%, ±5%, 16%, ±7%, ±8%, ±9%, ±10% or more of the definition; for example the term "substantially perpendicular" may mean the 90° perpendicular angle may mean "about 90". The term "generally" may be equivalent to "substantially".

The terms "adapted" and "configured" may be interchangeable and may mean an element or feature is designed or built to achieve a desired function.

The invention claimed is:

1. A bathing apparatus for a pet, comprising
a top section comprising walls to hold a pet;
a bottom section adapted to support and seat the apparatus on a surface; and
a bathing section situated between the top and bottom sections and comprising a bathing floor and an outer section,
wherein
the bathing floor is configured for a pet to sit or stand on,
the outer section is adapted to allow water to flow through and out of the apparatus, and
the bathing floor is curved upward so as to be convex in a vertical direction, to encourage water to flow away from a pet towards the outer section.

2. The bathing apparatus according to claim 1, wherein the outer section comprises a screen adapted to allow water to flow through and to capture hair or debris.

3. The bathing apparatus according to claim 1, wherein the outer section comprises a plurality of holes that allows water to flow through.

4. The bathing apparatus according to claim 1, wherein the outer section comprises a continuous open section.

5. The bathing apparatus according to claim 1, wherein the bathing floor comprises a plurality of holes adapted to allow water to flow through.

6. The bathing apparatus according to claim 1, wherein the outer section is positioned towards a perimeter of the bathing section.

7. The bathing apparatus according to claim 1, comprising a bottom floor positioned below the bathing floor, the bottom floor adapted to collect bathing water and/or to allow bathing water to pass through the bottom floor.

8. The bathing apparatus according to claim 1, comprising a bottom floor positioned below the bathing floor, the bottom floor containing a drain adapted to allow water to flow through and to collect hair or debris.

9. The bathing apparatus according to claim 1, comprising bottom floor positioned below the bathing floor, the bottom floor containing a drain, wherein the drain is adapted to be placed in an open or a closed position.

10. The bathing apparatus according to claim 1, wherein the bathing floor is coupled to a filter section.

11. The bathing apparatus according to claim 1, comprising a bottom floor positioned below the bathing floor, wherein the bottom floor is curved downward.

12. The bathing apparatus according to claim 1, comprising a bottom floor positioned below the bathing floor, the bottom floor comprising a plurality of holes adapted to allow water to pass through.

13. The bathing apparatus according to claim 11, wherein the bottom floor comprises a drain adapted to be placed in a closed or open position to allow the apparatus to hold water to provide a bath or to allow water to pass through to provide a shower, and wherein the bottom floor is curved downward towards the drain.

14. The bathing apparatus according to claim 13, comprising a drain plug adapted to close or open the drain, wherein the drain plug is accessible from the bathing floor.

15. The bathing apparatus according to claim 1, wherein the top section comprises 3 or 4 walls.

16. The bathing apparatus according to claim 1, wherein the bottom section comprises 3 or 4 feet or legs.

17. The bathing apparatus according to claim 1, wherein the height of the bathing floor relative to a sink or tub bottom is adjustable.

18. The bathing apparatus according to claim 1, wherein the walls comprise one or more tethers and/or one or more eyelets and/or one or more handles.

19. The bathing apparatus according to claim 1, wherein the bathing floor is textured.

20. The bathing apparatus according to claim 1, wherein the walls comprise a rear wall extending upward from the bathing section and configured to prevent backsplash.

* * * * *